US012689551B1

(12) United States Patent
Narkhede et al.

(10) Patent No.: US 12,689,551 B1
(45) Date of Patent: Jul. 21, 2026

(54) LOW LATENCY L1 SELF-HEALING SYSTEM AND METHOD

(71) Applicant: Morgan Stanley Services Group Inc., New York, NY (US)

(72) Inventors: Parag C. Narkhede, Claymont, DE (US); Joshua N. Elijah, New York, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/448,930

(22) Filed: Jan. 14, 2026

(51) Int. Cl.
| | |
|---|---|
| *H04L 41/0663* | (2022.01) |
| *H04L 45/00* | (2022.01) |
| *H04L 45/28* | (2022.01) |
| *H04L 49/101* | (2022.01) |

(52) U.S. Cl.
CPC .......... *H04L 41/0663* (2013.01); *H04L 45/22* (2013.01); *H04L 45/28* (2013.01); *H04L 49/101* (2013.01)

(58) Field of Classification Search
None
See application file for complete search history.

(56) References Cited

U.S. PATENT DOCUMENTS

| | | | |
|---|---|---|---|
| 5,088,091 A | 2/1992 | Schroeder et al. | |
| 5,138,615 A | 8/1992 | Lamport et al. | |
| 5,838,894 A | 11/1998 | Horst | |
| 6,973,041 B1 | 12/2005 | Duschatko et al. | |
| 7,245,582 B1 * | 7/2007 | Roberts | H04J 14/0295 |
| | | | 398/6 |
| 7,398,421 B1 | 7/2008 | Limaye et al. | |
| 8,020,056 B2 | 9/2011 | Vogt et al. | |
| 9,778,999 B2 | 10/2017 | Martin et al. | |
| 9,979,678 B2 | 5/2018 | Huang et al. | |
| 10,222,989 B1 | 3/2019 | Zitlaw | |
| 2005/0226148 A1 | 10/2005 | Assarpour | |
| 2007/0296458 A1 | 12/2007 | Kelem et al. | |
| 2007/0296459 A1 | 12/2007 | Kelem et al. | |
| 2008/0036489 A1 | 2/2008 | Kelem et al. | |
| 2011/0063972 A1 * | 3/2011 | Muley | H04L 45/16 |
| | | | 370/252 |
| 2012/0263035 A1 * | 10/2012 | Nakanishi | H04L 45/16 |
| | | | 370/225 |
| 2022/0210054 A1 | 6/2022 | Beecroft et al. | |
| 2023/0069177 A1 | 3/2023 | Albright et al. | |

* cited by examiner

*Primary Examiner* — Boris D Grijalva Lobos
(74) *Attorney, Agent, or Firm* — Leason Ellis LLP

(57) ABSTRACT

A system and method are provided for uninterrupted network data flow following loss of service. A plurality of switch devices are provided, each configured with a mapping that represents at least a portion of a data communication network topology. Each respective one of the plurality of switch devices is configured to perform operations, including: monitoring data transmission; detecting a loss of service; identifying, an other respective switch device of the plurality of switch devices for restoring the data stream; remapping to an alternative respective data pathway and to restore the data stream; identifying at least one first switch device of the plurality of switch device located upstream and at least one second switch device of the plurality of switch devices located downstream; and transmitting to each of the at least one first switch device and the at least one second switch device, information associated with the remapping.

18 Claims, 7 Drawing Sheets

502 START

504 Upstream sends mappings into FOT

506 CPU maps crossbar

508 CPU polls crossbar for link loss

510 Is a link loss detected?

no yes 512 loss_count++

514 Is loss_count > 3?

no yes

516 Lookup backup channel in FOT

518 Remap L1 switch

520 CPU alerts upstream of remap

600

602 — INFORMATION PROCESSOR w/WEB SERVER

608

604 — COMPUTING DEVICE

604 — COMPUTING DEVICE

608

608

608

606 — COMMUNICATION NETWORK(S), FOR EXAMPLE, THE INTERNET

608

604 — COMPUTING DEVICE)

604

LOW LATENCY L1 SELF-HEALING SYSTEM AND METHOD

FIELD

The present disclosure relates, generally, to data communication networking and, more particularly, to a system and method for providing self-healing in high-speed data replication and switching applications.

BACKGROUND

Detecting failed links in a network and being able to route around them is a crucial part in forming the resilience of a network. Failed links are caused by low level, physical, layer 1 issues which can range from displaced cables, burnt out laser drivers/photodiodes, incorrectly inserted small form-factor pluggable ("SFP") modules, or myriad other issues. As networks continue to expand in complexity, such occurrences become commonplace and are a challenge to manage. Current algorithms achieve resilience against such fails at the routing level, i.e., layer 3 of the Open Systems Interconnection ("OSI") model, using internet protocol ("IP") addresses and higher-level protocols such as Border Gateway Protocol ("BGP") with combination of Bidirectional Forwarding Detection ("BFD"). At a fundamental level they work by first learning a data communication network topology and using a state machine to figure out the "best path" between two given IP addresses.

These protocols are well-adopted, well-defined, and have achieved technological maturity. Unfortunately, the time required for a dropped link to be replaced with a working link (the "convergence time") can be seconds. Modern networks are increasingly topologically complex, which unfortunately increases the likelihood of failed links, despite also demanding greater uptimes and faster bandwidths. These two factors can make latencies experienced in traditional failover mechanisms increasingly intolerable.

Unlike layer-3 devices, layer-1 devices include no routing protocol, for example, for monitoring a link on a port. In the event a port goes down, there is no fallback provided by a layer-1 device, at least because a layer-1 device has no concept of redundancy. Some higher level devices (such as a layer-3 device or higher) can detect an interruption, such as a link being down, the higher-level device can, for example, reconfigure the layer-1 device. Although this can provide a fallback solution in case of an interruption, significant latency is incurred, even in cases where BFD protocols are employed. For example, BGP requires reconvergence to the backup cross connect, as the primary link is now unusable, notwithstanding the primary device's connection to an outside network remains usable. In cases where the layer-1 device to layer-3 device link is interrupted, the primary connection is no longer usable.

It is with respect to these and other considerations that the disclosure made herein is presented.

SUMMARY

In one or more implementations of the present disclosure, a system and method are provided for uninterrupted network data flow following loss of service. A plurality of switch devices are provided, each configured with a mapping that represents at least a portion of a data communication network topology. Each respective one of the plurality of switch devices is configured to perform operations, including: monitoring data transmission occurring via a respective data pathway associated with the respective switch device; detecting, by the respective switch device based on the monitoring, a loss of service associated with the respective switch device, resulting in a data stream interruption; identifying, by the respective switch device as a function of the mapping, an other respective switch device of the plurality of switch devices for restoring the data stream via an alternative respective data pathway; remapping, by the respective switch device as a function of the identified other one of the plurality of switch devices, to the alternative respective data pathway and to restore the data stream; identifying, by the respective switch device as a function of the remapping, at least one first switch device of the plurality of switch device located upstream of the respective switch device and at least one second switch device of the plurality of switch devices located downstream of the respective switch device; and transmitting, by the respective switch device to each of the at least one first switch device and the at least one second switch device, information associated with the remapping.

In one or more implementations of the present disclosure, each of the respective switch devices is a layer-1 switch.

In one or more implementations of the present disclosure, each of the respective switch devices is configured with a crossbar matrix and a microprocessor.

In one or more implementations of the present disclosure, the microprocessor remaps the respective network switch device via the crossbar matrix.

In one or more implementations of the present disclosure, the mapping is formatted as a failover table.

In one or more implementations of the present disclosure, the monitoring is by performed by polling.

In one or more implementations of the present disclosure, the interruption is due to link loss.

In one or more implementations of the present disclosure, a counter is included that is incremented at least twice prior to the remapping.

In one or more implementations of the present disclosure, incrementing the counter at least twice accommodates resolution of the interruption.

Other features of the present disclosure are shown and described herein.

BRIEF DESCRIPTION OF THE DRAWINGS

Aspects of the present disclosure will be more readily appreciated upon review of the detailed description of its various embodiments, described below, when taken in conjunction with the accompanying drawings, of which.

DETAILED DESCRIPTION

By way of overview and introduction, the present disclosure provides systems and methods for, among other things, a network failover mechanism at the layer-1 and layer-2 level of the OSI model, instead of traditional failover mechanisms such as BGP which exist at the layer-3 levels and above. The approach described here has the potential to reduce failover time from seconds (achieved with traditional layer 3 methods) down to single-digit milliseconds, greatly reducing data loss and network downtime caused by link failures.

Figure 1:
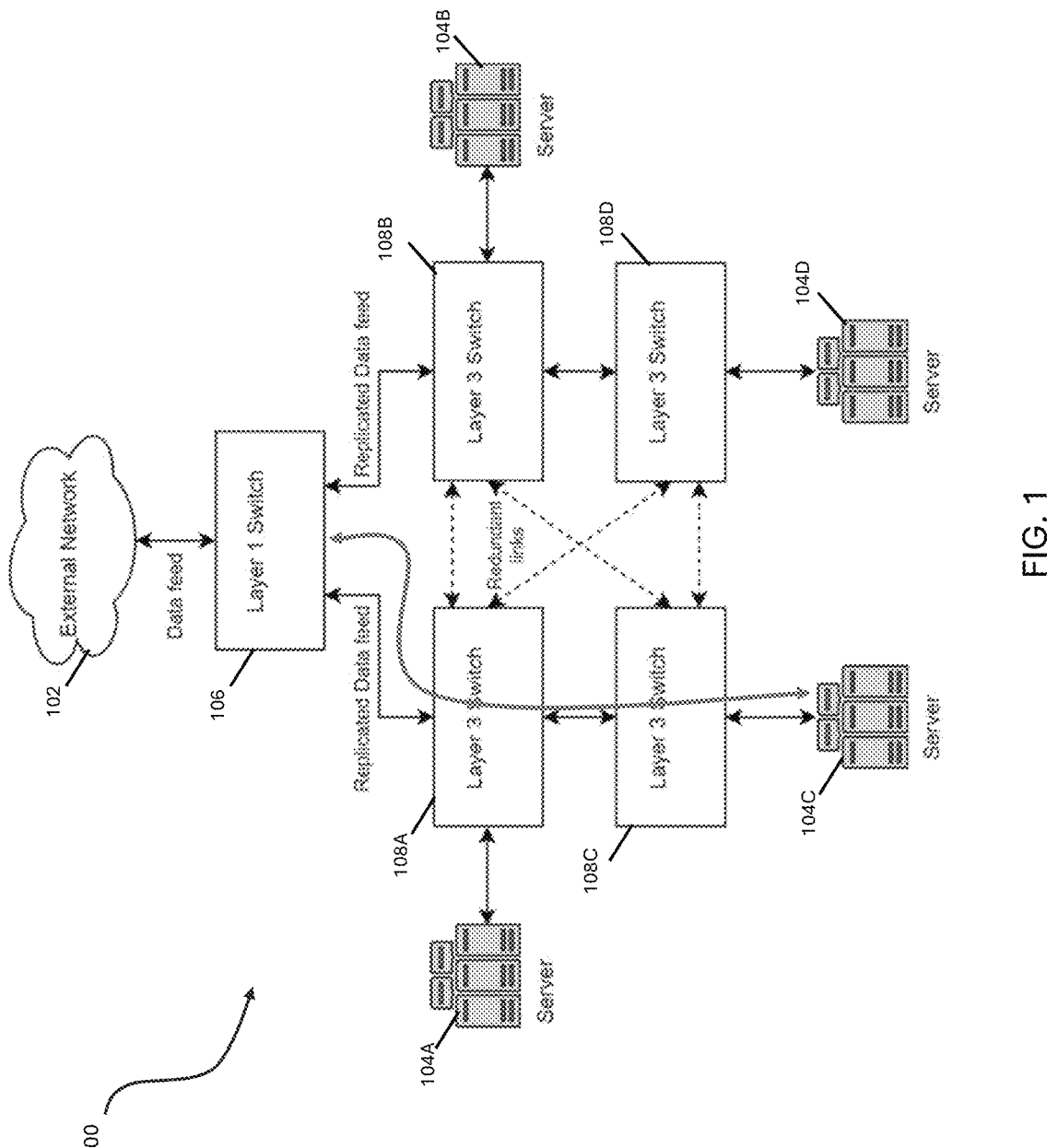
FIG. 1 is a diagram illustrating an example network topology that includes devices configured for providing a traditional failsafe technology.

Referring now to the drawings, FIG. 1 is a diagram illustrating an example network topology 100 that includes devices configured for providing a traditional failsafe technology. As shown in FIG. 1, external network 102 is included from which a data feed can be accessed and data distributed to multiple servers (servers 104A, 104B, 104C and 104D). As illustrated in FIG. 1, switch 106 operates simply to provide data replication. In a typical arrangement, a layer-1 switch is suitable for switch 106. Traditional failover mechanisms require router level access to network packets, and thus run on layer-3 switches (such as routers). Network topology 100 includes switches and servers (end nodes), of which at least some can provide redundancy as a failsafe, which can be critical for operation of traditional failover protection. External data feed is replicated using the layer-1 switch 106. The replicated data are respectively transmitted to layer-3 switches 108A and 108B. Layer-3 switches 108A and 108B are respectively connected to servers 104A and 104B. Furthermore, redundant links to layer-switches 108C and 108D are further connected to servers 108C and 108D. Thus, during normal operation and without interruption, data feeds are available to servers 108A, 108B, 108C, and 108D and the series of interconnections between all layer 3 switches provide for redundant data streams. Of course, one of ordinary skill will recognize that network topology 100 illustrated in FIGS. 1 and 2 is highly simplified and in the enterprise the numbers of servers, end nodes, switches, data feeds, and data streams are extremely large.

Figure 2:
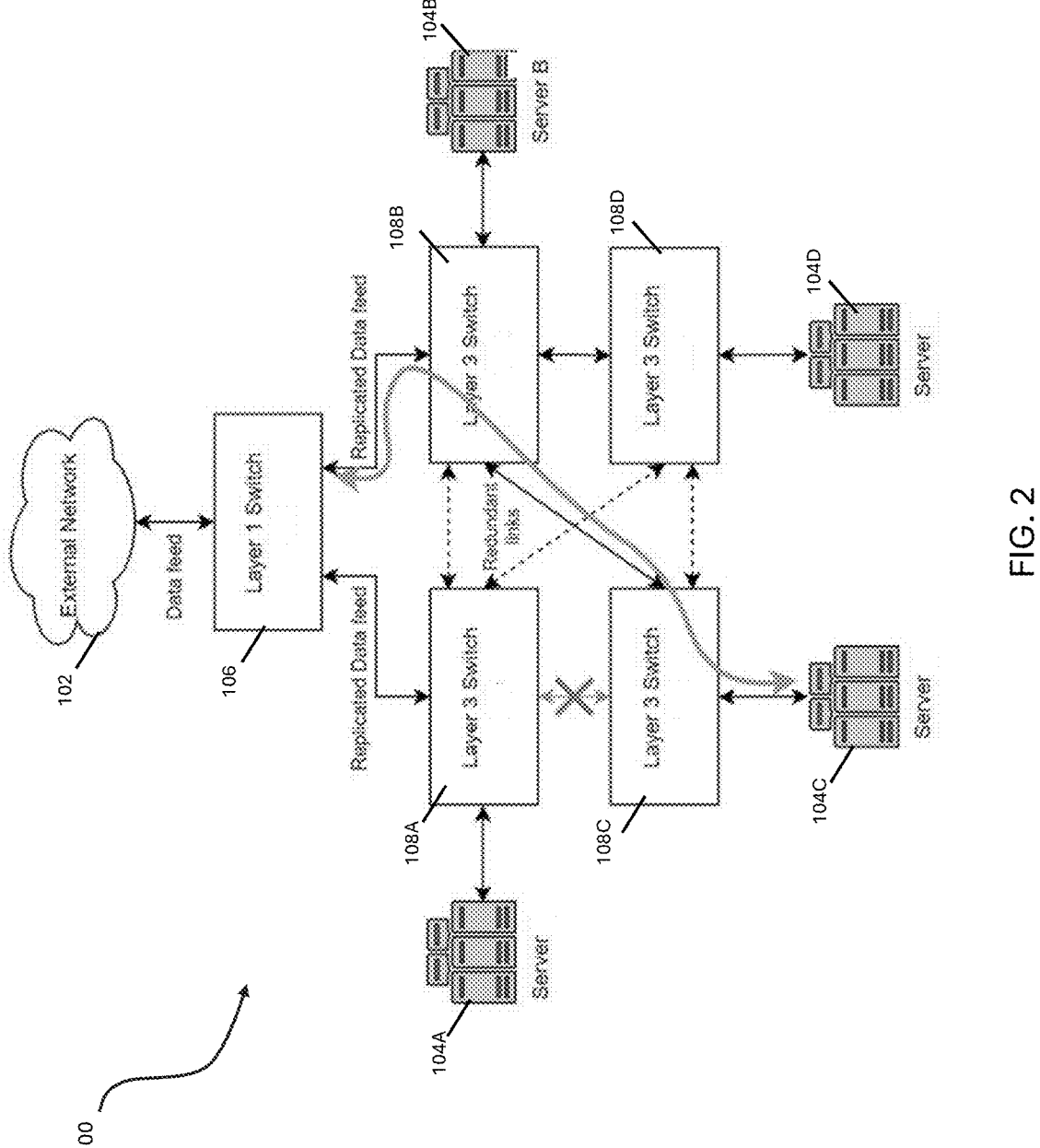
FIG. 2 illustrates the network topology shown in FIG. 1, following a data transmission interruption.
Figure 3:
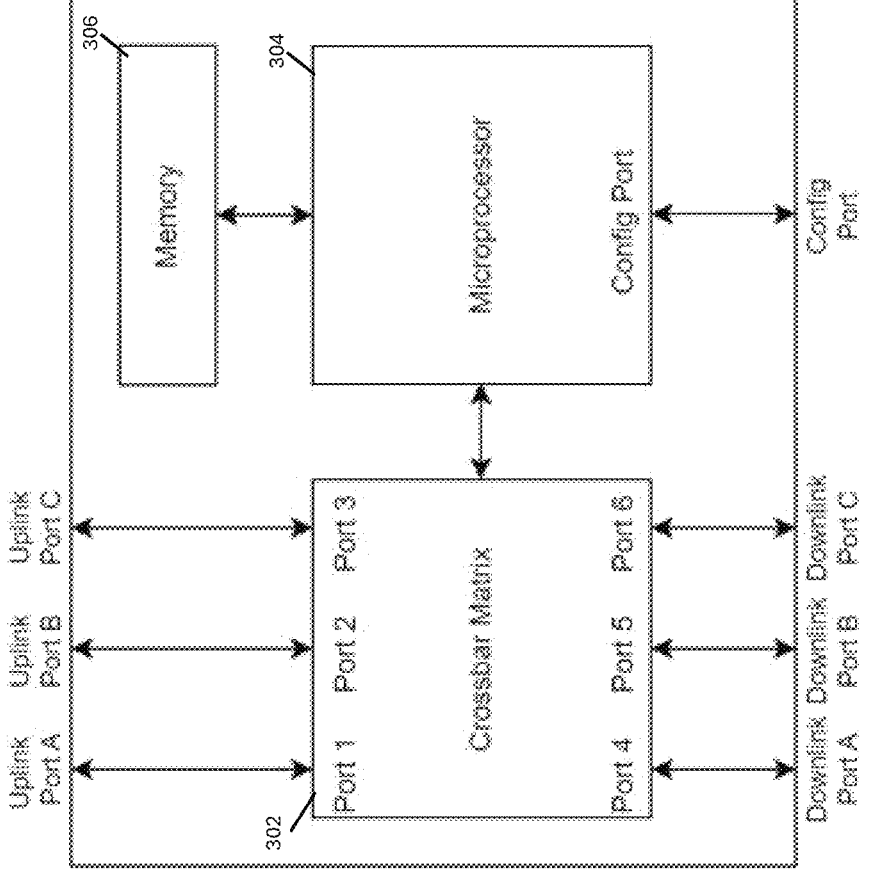
FIG. 3 illustrates an example self-healing layer-1 switch, in accordance with one or more implementations of the present disclosure.

FIG. 2 illustrates network topology 100 following a data transmission interruption. As illustrated, the link between layer-3 switch 108A and layer-3 switch 108C is broken. Traditional failover mechanisms (e.g., layer-3 switches shown in FIGS. 1 and 2) can operate to establish one or more replacement data paths in network topology 100 and restore data flow. As shown in FIG. 3, once aware of the broken link, layer-3 switch 108B reroutes data to layer-3 switch 108C and the link to the data feed is restored. Unfortunately, significant latency is incurred.

The systems and methods shown and described herein provide a technical solution to latency-related problems, including by replacing one or more layer-3 switches with specially configured layer-1 switches. Referred to, generally, herein as a "self-healing layer-1 switch", the layer-1 switches configured in accordance with the present disclosure can perform self-healing operations, such as rerouting data in the event of a link break or other event requires self-healing. One or more implementations of the present disclosure includes substituting layer-3 switches (e.g.,), with special layer 1 switches that are configured with network topology self-healing functionality.

FIG. 3 illustrates an example self-healing layer-1 switch 300, in accordance with one or more implementations of the present disclosure. The example self-healing layer-1 switch 300 includes crossbar matrix 302 which, in the example shown in FIG. 3, has six ports along with microprocessor 304 and memory element 306. The microprocessor 304 can execute one or more instructions that can configure the crossbar matrix 302 mapping, as well as read the internal state of the ports (e.g., ports 1-6). The respective protocol by which the microprocessor 304 reads/writes to/from the crossbar matrix 302 can depend on the particular implementation(s), including the respective design of the crossbar matrix 302. For example, the protocol can be an embedded level serial protocol, such as I2C or SPI, which allows configuration of the crossbar matrix 302 to be achieved in milliseconds. Also as shown in FIG. 3, the microprocessor 304 can also expose a configuration port. For example, by assigning an address to the port and communicating via the port to a peripheral device via the address.

In operation, the microprocessor 304 frequently monitors the status of all ports on the crossbar matrix 302, for example, via direct communication with the crossbar switch. The microprocessor can be loaded with a table, both at startup and at regular intervals, though preferably not during latency critical intervals. The table can include a list of primary ports and associated backup ports, referred to herein, generally, as a fail-over table (FOT), which can be include information representing network topology, including data paths. The microprocessor 304 can expose a network port allowing for FOT loading at any time.

Figure 4:
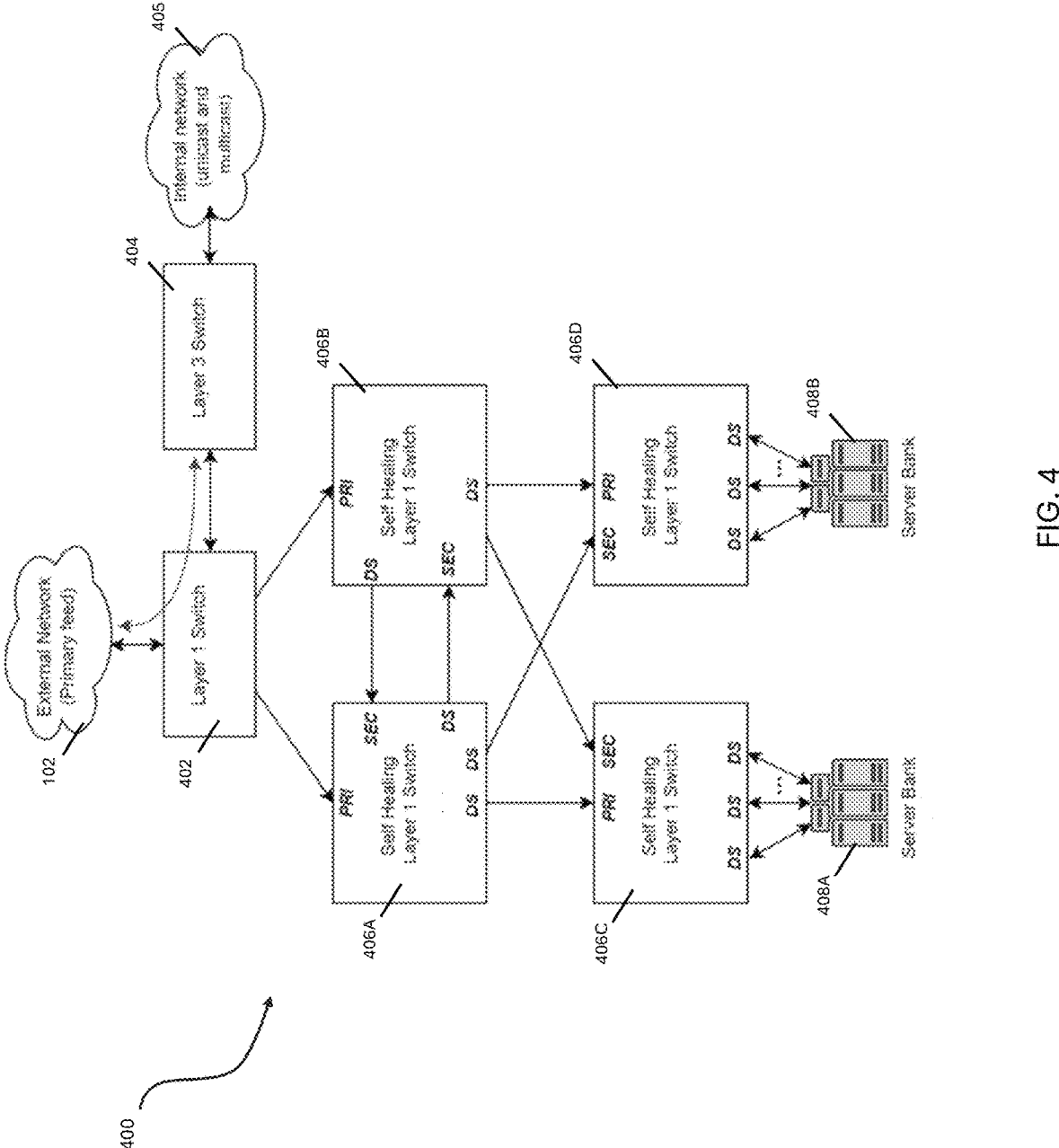
FIG. 4 illustrates an example network topology in accordance with an example implementation of the present disclosure.

FIG. 4 illustrates an example network topology in accordance with an example implementation of the present disclosure. As shown in FIG. 4, self-healing layer1 switches are incorporated in place of, for example, layer-2 switches and layer-3 switches. Various layer-2 switch and layer-3 switch capabilities for fail-over protection and that incur latency can be handled by self-healing layer-1 switches. At least in part as a function of network information in the FOT, the microprocessor 304 can execute one or more instructions to detect a port that has failed and remap the crossbar switch 302 based on defined redundant channels. The same failover functionality as shown and described in FIGS. 1 and 2 can be implemented, albeit more quickly and with substantially less latency.

In the example topology 400 shown in FIG. 4, external network 102 is included from which a data feed can be accessed and data received. Layer-1 switch 402 operates to provide data replication. Further data are transmitted via layer-1 switch 402 to Layer 3 switch 404 and, thereafter, to and from internal network 405. In one or more implementations, switch 404 can be a traditional Layer 3 switch, such as a network router that can be positioned to receive a copy of all data sent to and received from external network 102. In operation, switch 404 can interface with a traditional internal network, such as shown and described herein with reference to FIG. 1, which includes other Layer 3 switches. Accordingly, features of the present disclosure can be applied in traditional networks, for example, in the enterprise, that use Layer 3 switches. For example, internal networks (e.g., unicast and multicast) can effectively be expanded out into a network, such as the example shown in FIG. 1, with fewer or none of the low latency servers/components illustrated therein. Moreover, and as illustrated in FIG. 4, self-healing layer-1 switches 406A, 406B, 406C, and 406D are configured to provide failsafe redundancy, as shown and described herein. In the example shown in FIG. 4, self-healing switches 406A, 406B, 406C, and 406D can be the same or structurally similar to self-healing switch 300 (FIG. 3). Moreover, interfaces within self-healing switches 406A, 406B, 406C, and 406D enable the switches to operate in respective ways in accordance with given operational contexts. Under normal, uninterrupted data stream operation, data flows through the primary interfaces ("PRI") of 406A, 406B, 406C, and 406D to downstream interfaces while the secondary interfaces ("SEC") are inactive.

In case a primary interface of a given switch 406A, 406B, 406C, and/or 406D fails, respective interfaces of others of switch(es) 406A, 406B, 406C, and/or 406D associated with the failed primary interface of the given switch get reassigned to operate respective secondary interfaces. For example, programming instructions are executed by processor microprocessor 304 and entries in the failover table (FOT) referenced to configure crossbar matrix 302 accordingly.

The present disclosure addresses a technical problem by reducing the amount of latency incurred by systems maintaining failsafe data streams. The complexity of network topology 400 is reduced as a function of self-healing layer-1 switches used in place of layer-2 or layer-3 switches. This architecture allows the L1 Switch and CPU combination to dynamically reconfigure channel mapping in the event of the primary feed being lost. Moreover, both primary and backup feeds (both carrying the same data) can exist within a self-healing layer-1 switch, via a CPU (e.g., microprocessor 304) that is configured to access the FOT and that couples both feeds together. In one or more implementations of the present disclosure, the FOT failover table can be uploaded to self-healing layer-1 switch. In one or more implementation, network topology 400 comprises one or more smaller network sections as opposed to whole, large networks where topologies can change without warning.

Figure 5:
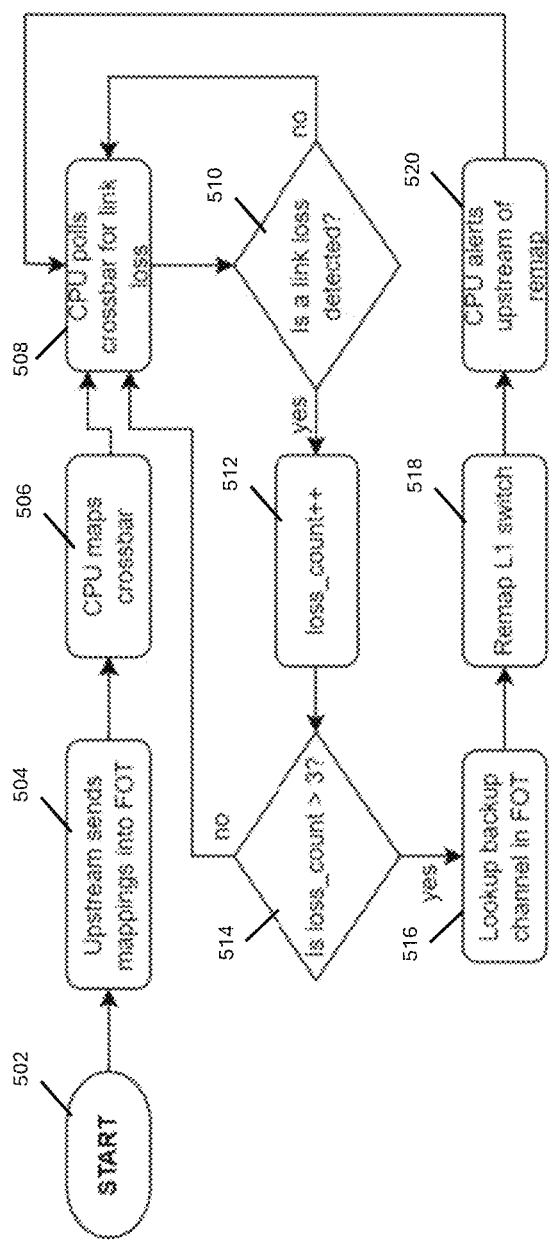
FIG. 5 is a flow diagram showing a routine of an example implementation of the present disclosure.

FIG. 5 is a flow diagram showing an example routine of a broad implementation of the present disclosure, including an interaction between the microprocessor 304, the crossbar matrix 302, and the devices in network topology 400. It is to be appreciated that several of the logical operations described herein are implemented as a sequence of computer-implemented acts or program modules running on one or more computing devices. Accordingly, the logical operations described herein are referred to variously as operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Continuing with reference to FIG. 5, at step 502, the process starts and mappings associated with a respective network topology (e.g., network topology 400) get sent to a self-healing layer-1 switch (e.g., switch 300) in a FOT, via one or more upstream processes and/or devices (step 504). Thereafter, a microprocessor configured with the self-healing layer-1 switch (e.g., microprocessor 304) maps a crossbar matrix configured with the self-healing layer-1 switch (e.g., crossbar matrix 302) in accordance with the information representing the network topology in the FOT (step 506). At step 508, a looping process is implemented and the self-healing layer-1 switch polls for link loss, as a function of the microprocessor and the crossbar matrix. At step 510, based on the polling in step 508, a determination is made whether a link loss is detected (e.g., the polling returns a value of 0 or 1 representing link loss or an active link). If the determination at step 510 is negative and no link loss is detected, the process branches back to step 508 and the self-healing layer-1 switch polls for link loss. In one or more implementations, if the determination at step 510 is negative and a value of a loss_count variable (e.g., previously incremented at step 512) is greater than 0 than prior to branching to step 508, one or more devices can reset the loss_count variable to 0.

Alternatively, if the determination at step 510 is affirmative and link loss is detected, then the process branches to step 512 and a loss_count variable is incremented by a value, such as by a value of 1. Thereafter, the process continues to step 514 and a determination is made whether the loss_count variable has a value that is greater than 3. Of course, one of ordinary skill will recognize that other counter techniques, including use of values other than 3, can be suitable.

Continuing with reference to FIG. 5, if the determination at step 514 is negative and the loss_count variable is not greater than 3, then the process branches back to step 508. Alternatively, if the determination at step 514 is affirmative and the loss_count variable is greater than 3, then the process branches to step 516. At step 516, a backup channel (e.g., an alternative data pathway) that is suitable for maintaining data flow between two respective endpoints is identified, such as via a lookup process executed by microprocessor 304 using the FOT. Thereafter, at step 518 the self-healing layer-1 switch is remapped (e.g., via the crossbar matrix), thereby restoring data flow. Moreover, at step 520, the microprocessor alerts one or more upstream devices (e.g., other self-healing layer-1 switches in the network topology) of the remapping of step 518. Thereafter, the process continues back to 508.

Accordingly, and as shown and described herein with reference to FIGS. 1-5, a self-healing layer-1 switch can detect a loss link or loss of signal ("LOS"), for example, via crossbar matrix 302, by way of an electrical idle. In one or more implementations of the present disclosure, on the lowest level, an electrical idle has both sides of the differential signal being at the same voltage (typically the common-mode voltage, which can be OV, or the midpoint between the positive and negative swing of the signal), as opposed to logic level 0. As known in the art, a differential signal uses two physical wires, pins, and/or traces allow for a positive side and negative side. Both wires together carry a single bit. For example, nonreturn-to-zero (NRZ) signaling, in which both wires switch between a positive voltage and a negative voltage, is usable to detect LOS. For example, a logic level of 1 can be represented by the positive side being a positive voltage (typically 1.4V in LVDS) and the negative side being a negative voltage (−1.4V in LVDS). Alternatively, a logic 0 can be represented by the opposite. In such a system having both differential lines at the same voltage can be neither a logic 1 nor 0. An electrical idle is when both sides are at the same common-mode voltage, and represents a "no link" state on the port, which means the port is down.

In one or more implementations, Energy Efficient Ethernet (IEEE 802.3az) defines how an ethernet port may behave to reduce its power consumption by putting an ethernet port into an electrical idle state and occasionally transmitting idle signals. Using this technology uses the electrical idle to reduce power, but this does not mean the link is down. The systems and methods shown and described herein can provide for detecting electrical idles and, accordingly, provides for failsafe data transmissions with ultra-low latency. The self-healing technology shown and described herein solves layer-1 problems in a much faster time than traditional methods.

As shown and described herein, the present disclosure includes a self-healing switch configured with crossbar matrix 302 that can notify microprocessor 304 immediately in the case of a loss of link. This typically takes a form of an interrupt signal, a simple logic level signal connected between the crossbar and the microprocessor. The interrupt signal can be a logical "AND" of the link status of all ports on the crossbar. In operation, when the microprocessor detects a change in this signal, it reads the registers of the crossbar to determine which port (e.g., 406A, 406B, 406C, and/or 406D) went down. In one or more implementations, once an electrical idle is detected on a port the microprocessor does not implement fail-over operations immediately. Instead, a timer (e.g., a dead timer) is invoked and the microprocessor periodically checks (e.g., polls) the port for more electrical idles and the dead timer increments, accordingly. If electrical idles continue to be detected up to a certain time (the "dead time"), the microprocessor implements the failover. This delay adds tolerance to sporadic faults and allows for resolution absent failsafe measures. The amount of dead time can depend on one or more factors, such as the speed of data flow. In one or more implementations, a bit period is 96 ps for a 10GBASE-KR signal, and a dead time of 960 ps, corresponding to 100 bits, may be suitable.

The table below identifies times of specific processes that occur during a failover event, in accordance with an implementation of the present disclosure.

| | |
|---|---|
| Typical time to remap crossbar (based on Macom chip) | 10 nanoseconds |
| SPI Clock Frequency | 200 MHz |
| Number of bits | 64 |
| Time for full SPI transaction assuming 200 MHz clock frequency and 64 bits | 320 nanoseconds |
| CPU tme to react to interupt or poll change assuming 100 MHz CPU Clock and 30 clock cycles | 300 nanoseconds |
| Crossbar propagation delay including PCB traces | 5 nanoseconds |
| TOTAL ESTIMATED SWITCHING TIME | 626 nanoseconds |

One of ordinary skill will recognize that failover technology in accordance with the present disclosure can be provided in a sub-millisecond timescale, which represents a large technological improvement over the order of seconds typically required for traditional fail-over methods. The present disclosure provides significant improvements by reducing latency as a function of moving redundancy to Layer-1 switches, coupled with basic detection mechanisms that are then exposed to the rest of the network, including as a function of a FOT configuration.

It is to be appreciated that higher level failover mechanisms, such as BGP, Virtual Router Redundancy Protocol (VRRP), and Spanning Tree Protocol (STP) or Rapid Spanning Tree Protocol (RSTP), can be applied in combination with this mechanism. In such instance, the mechanism loses data during the switching event, as evidenced by a single ethernet frame of 66 bits at 10GBASEKR is 6.4 nanoseconds in duration, thus a switching time of 626 nanoseconds corresponds to losing around 100 frames (6600 bits) in a single failover event. Given that a standard ethernet packet is 1518 bytes (12144 bits), 6600 bits corresponds to losing, at maximum, two standard ethernet packets. This is not enough to trigger the high-level fail over mechanisms and will simply be seen as a temporary number of bit errors.

Figure 6:
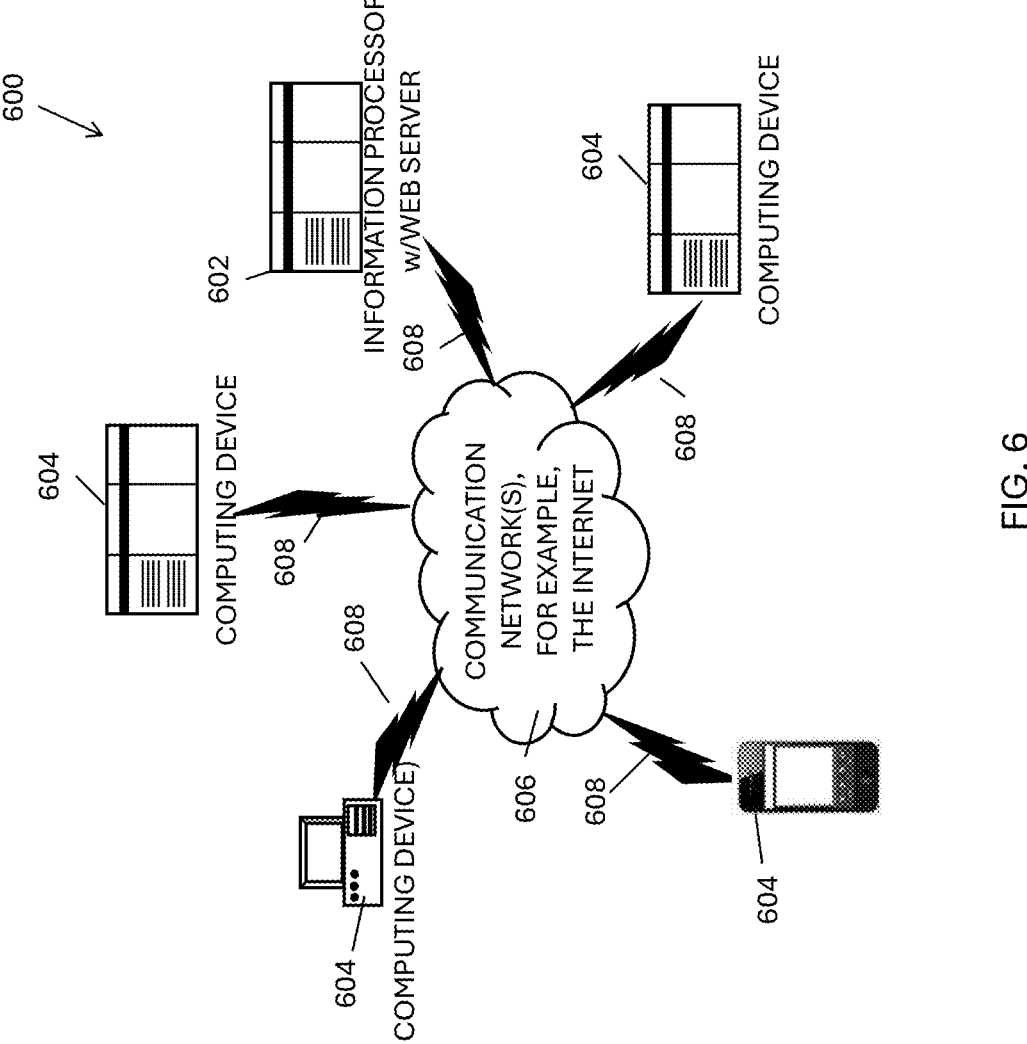
FIG. 6 is a diagram showing an example hardware arrangement that can be configured for providing the systems and methods disclosed herein.

Referring to FIG. 6, a diagram is provided that shows an example hardware arrangement that is configured for providing the systems and methods disclosed herein and designated generally as system 600. System 600 can include one or more information processors 602 that are at least communicatively coupled to one or more user computing devices 604 across communication network 606. Information processors 602 and user computing devices 604 can include, for example, mobile computing devices such as tablet computing devices, smartphones, personal digital assistants or the like, as well as laptop computers and/or desktop computers, server computers and mainframe computers. Further, one computing device may be configured as an information processor 602 and a user computing device 604, depending upon operations being executed at a particular time.

With continued reference to FIG. 6, information processor 602 can be configured to access one or more databases for the present disclosure, including FOTs, source code repositories, and other information. However, it is contemplated that information processor 602 can access any required databases via communication network 606 or any other communication network to which information processor 602 has access. Information processor 602 can communicate with devices comprising databases using any known communication method, including a direct serial, parallel, universal serial bus ("USB") interface, or via a local or wide area network.

User computing devices 604 can communicate with information processors 602 using data connections 608, which are respectively coupled to communication network 606. Communication network 606 can be any data communication network. Data connections 608 can be any known arrangement for accessing communication network 606, such as the public internet, private Internet (e.g., VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 604 preferably have the ability to send and receive data across communication network 606, and are equipped with web browsers, software disclosures, or other means, to provide received data on display devices incorporated therewith. By way of example, user computing device 604 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 606, and that wireless communication can be provided between wireless devices and information processors 602.

System 600 preferably includes software that provides functionality described in greater detail herein and preferably resides on one or more information processors 602 and/or user computing devices 604. One of the functions performed by information processor 602 is that of operating as a web server and/or a web site host. Information processors 602 typically communicate with communication network 606 across a permanent (i.e. un-switched) data connection 608. Permanent connectivity ensures that access to information processors 602 is always available.

Figure 7:
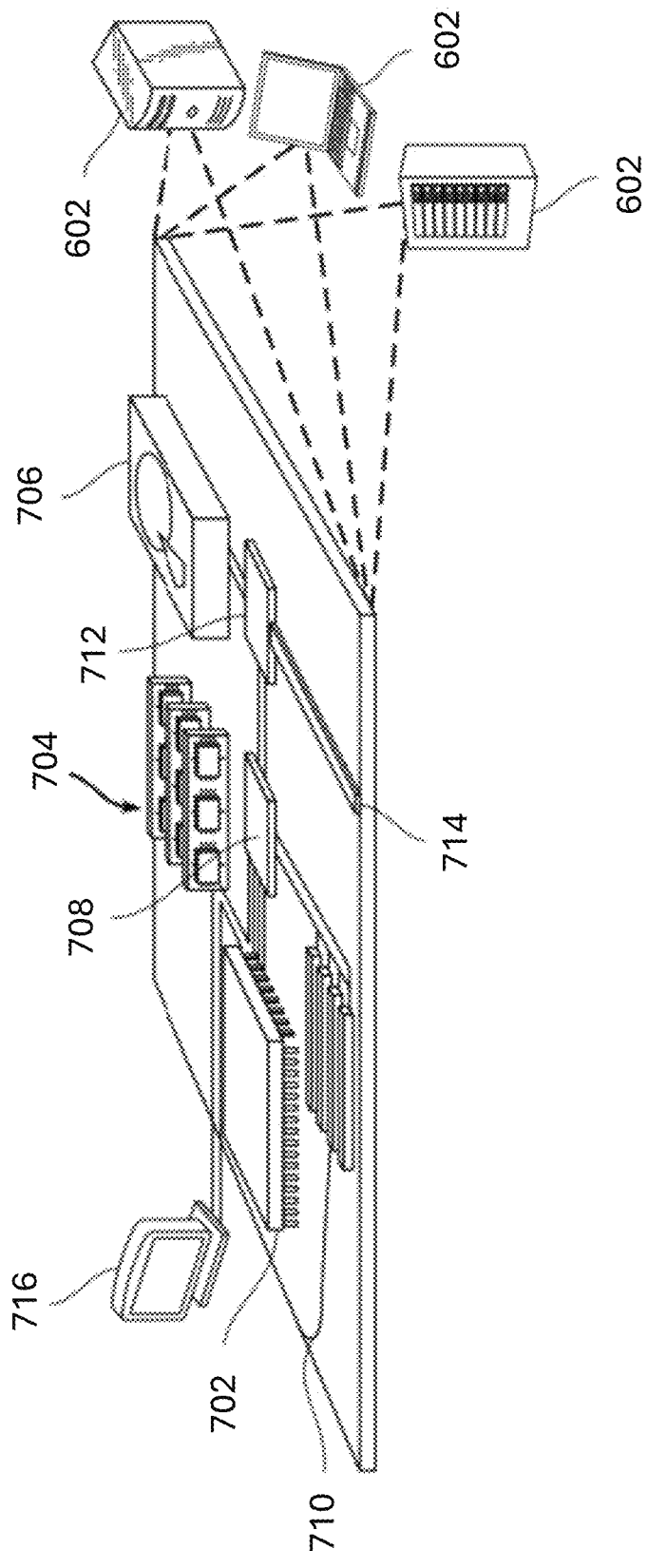
FIG. 7 shows an example information processor and/or user computing device.

FIG. 7 shows an example information processor 602 and/or user computing device 604 that can be used to implement the techniques described herein. The information processor 602 and/or user computing device 604 is intended to represent various forms of digital computers, such as laptops, desktops, workstations, personal digital assistants, servers, blade servers, mainframes, and other appropriate computers. The components shown in FIG. 7, including connections and relationships, and their functions, are meant to be exemplary only, and are not meant to limit implementations of the inventions described and/or claimed in this document.

As shown in FIG. 7, the information processor 602 and/or user computing device 604 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and can be mounted on a common motherboard or in other manners as appropriate. The processor 702 can process instructions for execution within the information processor 602 and/or user computing device 604, including instructions stored in the memory 704 or on the storage device 706 to display graphical information for a GUI on an external input/output device, such as a display 716 coupled to the high-speed interface 708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 704 stores information within the information processor 602 and/or user computing device 604. In some implementations, the memory 704 is a volatile memory unit or units. In some implementations, the memory 704 is a non-volatile memory unit or units. Memory 704 can also be another form of computer-readable medium, such as a magnetic or optical disk.

The storage device 706 is capable of providing mass storage for the information processor 602 and/or user computing device 604. In some implementations, the storage device 706 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program can also be tangibly embodied in an information carrier. The computer program product can also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 can be configured to manage bandwidth-intensive operations, while the low-speed interface 712 can be configured to manage lower bandwidth-intensive operations. Of course, one of ordinary skill in the art will recognize that such allocation of functions is exemplary only. In some implementations, the high-speed interface 708 is coupled to the memory 704, the display 716 (e.g., through a graphics processor or accelerator), and to the high-speed expansion ports 710, which can accept various expansion cards (not shown). In implementation, the low-speed interface 712 is coupled to the storage device 706 and the low-speed expansion port 714. The low-speed expansion port 714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter. Accordingly, the automated methods described herein can be implemented by in various forms, including an electronic circuit configured (e.g., by code, such as programmed, by custom logic, as in configurable logic gates, or the like) to carry out steps of a method. Moreover, steps can be performed on or using programmed logic, such as custom or preprogrammed control logic devices, circuits, or processors. Examples include a programmable logic circuit (PLC), computer, software, or other circuit (e.g., ASIC, FPGA) configured by code or logic to carry out their assigned task. The devices, circuits, or processors can also be, for example, dedicated or shared hardware devices (such as laptops, single board computers (SBCs), workstations, tablets, smartphones, part of a server, or dedicated hardware circuits, as in FPGAs or ASICs, or the like), or computer servers, or a portion of a server or computer system. The devices, circuits, or processors can include a non-transitory computer readable medium (CRM, such as read-only memory (ROM), flash drive, or disk drive) storing instructions that, when executed on one or more processors, cause these methods to be carried out.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this disclosure, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed:

1. A system for providing uninterrupted network data flow following loss of service, the system comprising:

a plurality of switch devices, each of the switch devices configured with a mapping that represents at least a portion of a data communication network topology, wherein each respective one of the plurality of switch devices is configured to perform operations, including:

monitoring data transmission occurring via a respective data pathway associated with the respective switch device;

detecting, by the respective switch device based on the monitoring, a loss of service associated with the respective switch device, resulting in a data stream interruption;

identifying, by the respective switch device as a function of the mapping, an other respective switch device of the plurality of switch devices for restoring the data stream via an alternative respective data pathway;

remapping, by the respective switch device as a function of the identified other one of the plurality of switch devices, to the alternative respective data pathway and to restore the data stream;

identifying, by the respective switch device as a function of the remapping, at least one first switch device of the plurality of switch device located upstream of the respective switch device and at least one second switch device of the plurality of switch devices located downstream of the respective switch device; and transmitting, by the respective switch device to each of the at least one first switch device and the at least one second switch device, information associated with the remapping.

2. The system of claim 1, wherein each of the respective switch devices is a layer-1 switch.

3. The system of claim 2, wherein each of the respective switch devices is configured with a crossbar matrix and a microprocessor.

4. The system of claim 3, wherein the microprocessor remaps the respective network switch device via the crossbar matrix.

5. The system of claim 1, wherein the mapping is formatted as a failover table.

6. The system of claim 1, wherein the monitoring is by performed by polling.

7. The system of claim 1, wherein the interruption is due to link loss.

8. The system of claim 1, further comprising a counter, wherein the counter is incremented at least twice prior to the remapping.

9. The system of claim 8, wherein incrementing the counter at least twice accommodates resolution of the interruption.

10. A method for providing uninterrupted network data flow following loss of service, the method comprising:

receiving, by each of a plurality of switch devices, a mapping that represents at least a portion of a data communication network topology;

monitoring, by each of the plurality of switch devices, data transmission occurring via a respective data pathway;

detecting, by a respective switch device of the plurality of switch devices, based on the monitoring, a loss of service resulting in a data stream interruption;

identifying, by the respective switch device as a function of the mapping, an other respective switch device of the plurality of switch devices capable of restoring the data stream via an alternative respective data pathway;

remapping, by the respective switch device, as a function of the identified other one of the plurality of switch devices, to the alternative respective data pathway and to restore the data stream;

identifying, by the respective switch device as a function of the remapping, at least one first switch device of the plurality of switch device located upstream of the respective switch device and at least one second switch device of the plurality of switch devices located downstream of the respective switch device; and transmitting, by the respective switch device to each of the at least one first switch device and the at least one second switch device, information associated with the remapping.

11. The method of claim 10, wherein each of the plurality of switch devices is a layer-1 switch.

12. The method of claim 11, wherein each of the plurality of switch devices is configured with a crossbar matrix and a microprocessor.

13. The method of claim 12, further comprising remapping, by the microprocessor, the respective switch device via the crossbar matrix.

14. The method of claim 10, wherein the mapping is formatted as a failover table.

15. The method of claim 10, wherein the monitoring is by performed by polling.

16. The method of claim 10, wherein the interruption is due to link loss.

17. The method of claim 10, further comprising:
incrementing a counter at least twice prior to the remapping.

18. The method of claim 17, wherein incrementing the counter at least twice accommodates resolution of the interruption.

\* \* \* \* \*